Patented Apr. 29, 1930

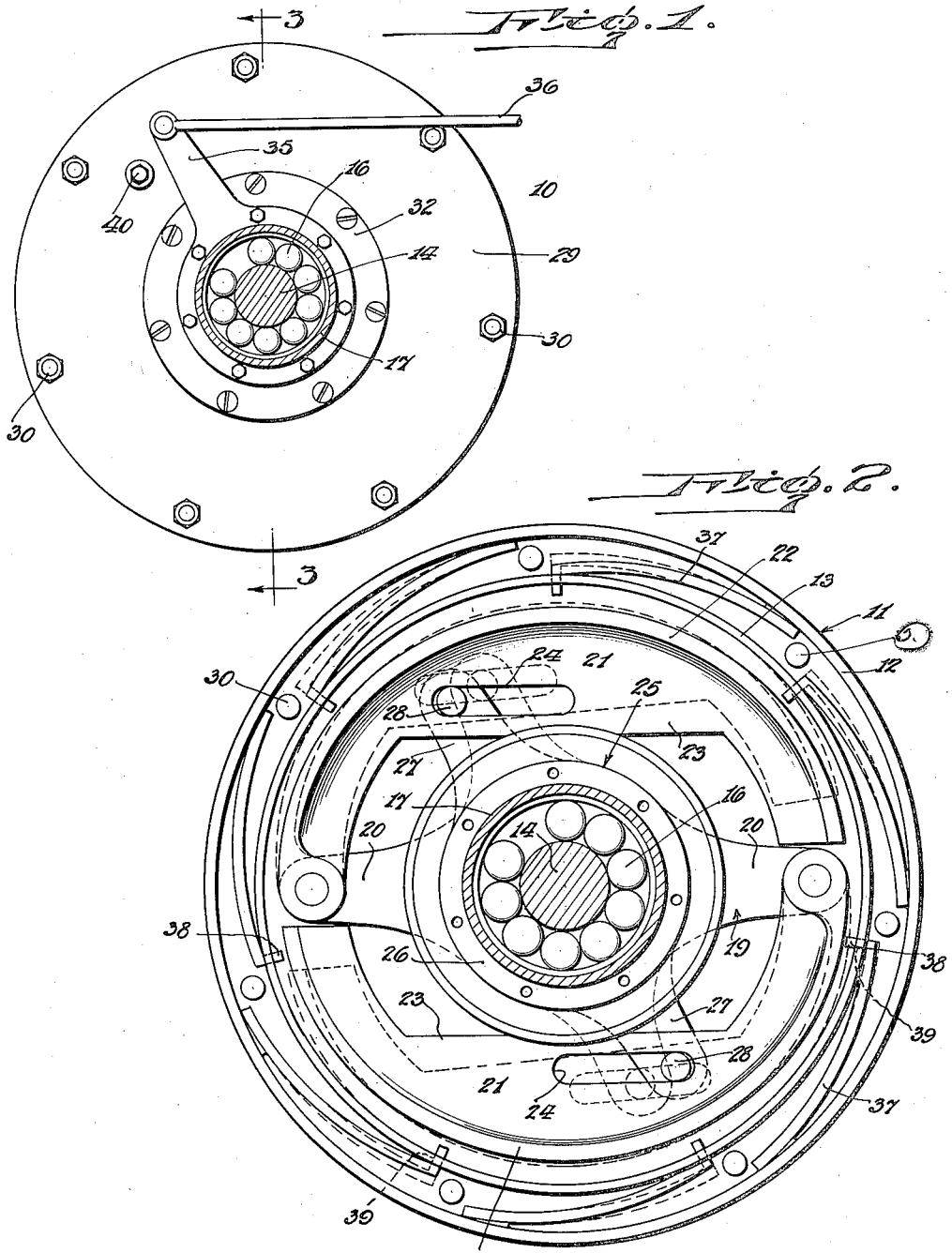

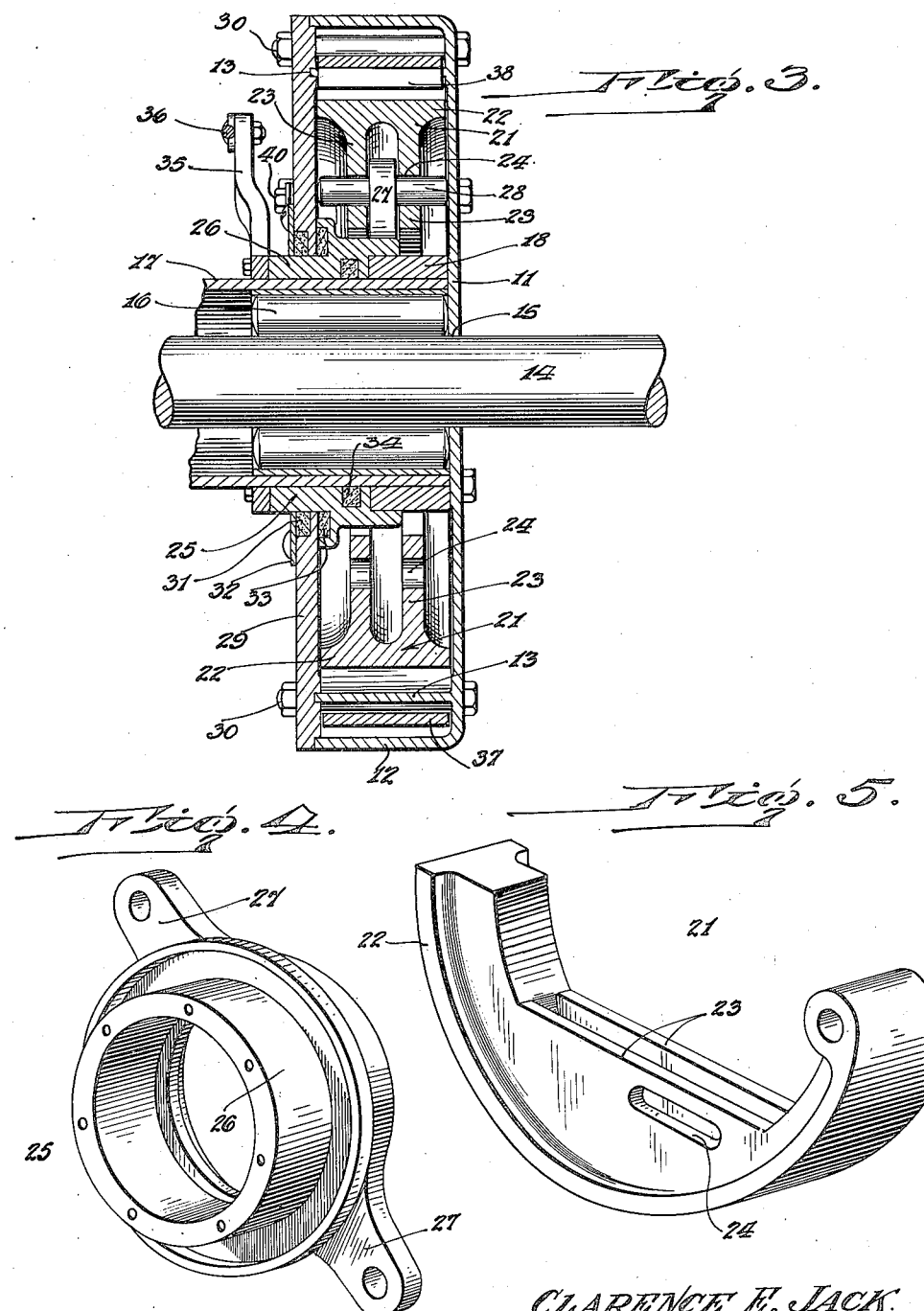

1,756,904

UNITED STATES PATENT OFFICE

CLARENCE E. JACK, OF NEWBURGH, NEW YORK

HYDRAULIC BRAKE

Application filed January 12, 1929. Serial No. 332,039.

This invention relates to improvements in hydraulic brakes, clutches and the like.

The primary object of the invention resides in a hydraulic brake for automobiles which is designed to overcome the many objections of the present friction brake, such as the non-effective braking action caused by excessive wear, and when wet or ice coated; burned out brakes when descending long and steep hills; and by providing a brake which requires no adjustments, and which will outlive the life of the automobile on which it is installed.

Another object of the invention is to provide an automobile brake wherein the initial braking action is hydraulically controlled, and the extreme or final braking action is accomplished by friction.

A further object of the invention is the provision of a hydraulic brake by which wheel packing is eliminated, and wherein each brake contains its own supply of oil which is a decided advantage over the present hydraulic brakes which receive their supply from a common source.

A still further object is the provision of a hydraulic brake which is simple in construction, easy and positive of operation, and which consists of but a limited number of working parts.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a side elevation of my improved hydraulic brake.

Figure 2 is a similar view with the inner side plate removed showing the brake shoes in unbraking position in full lines, and in braking position in dotted lines.

Figure 3 is a vertical transverse sectional view on the line 3—3 of Figure 1.

Figure 4 is a detail perspective view of the movable spider.

Figure 5 is a detail perspective view of one of the brake shoes.

Referring to the drawing by reference characters, the numeral 10 designates my improved hydraulic brake in its entirety, which includes an annular housing 11 open at its inner side and provided with an outer brake drum or flange 12, and a spaced inner brake drum or flange 13. The housing 11 is fixedly attached to the wheel of an automobile (not shown) in the usual manner and which wheel is keyed to the rear driven axle 14 which passes through a central opening 15 in the outer side wall of the housing. The axle is journalled for rotation in a roller bearing 16 contained within the usual axle housing 17 which extends into the open side of the housing and terminates against the outer side wall thereof.

Fixed to the axle housing 17 is the hub 18 of a stationary spider 19 which has diametrically disposed arms 20 extending from the hub. Pivoted to each arm 20 is a segmental brake shoe 21, the curvature of the major portion of which is concentric with respect to the axis of the axle 14. The radii of the ends of the brake shoes are eccentric with respect to the axis of the axle 14 for a purpose to be hereinafter explained. Each brake shoe includes an outer wide flange 22 and spaced inwardly extending webs 23, the said webs having aligned elongated slots 24 therein.

Turnably mounted on the axle housing 17 is a movable actuating spider 25 which includes a hub 26 from which diametrically opposed arms or ears 27 extend. The arms 27 fit between the webs 23 of the respective brake shoes and carry oppositely extending pins 28 which are received in the slots 24 and normally disposed adjacent one of the ends thereof.

For closing the inner open sides of the housing 11 and for holding the movable spider 26 in position, I provide a removable plate or disk 29 suitably bolted to the outer wall of the housing by removable fastening elements 30. The outer side of the plate 29 is recessed to receive a packing 31 about the hub of the movable spider which is held in position by a removable ring 32. The hub of the spider 25 is also recessed to receive packing 33 to seal the loose joint between itself and the inner side of the plate 29, while packing 34 carried by the hub provides a seal between itself and the axle housing 17. The hub of the spider 25 projects beyond the plate 29 to receive an actuating arm 35 which is connected to the brake pedal of an automobile by a connecting rod or cable 36.

The inner face of the closure plate 29 is recessed to receive the flanges 12 and 13 as clearly shown in Figure 3 of the drawings to provide a tight joint therebetween.

Fixedly secured to the inner wall of the flange 12 is one end of a plurality of resilient vane members 37, the other ends of said members being bent at an angle as at 38 substantially radial with respect to the axis of the axle 14. The bent portions 38 extend through transverse slots 39 in the inner drum or flange 13 to normally project inwardly therefrom and which are disposed in the path of expanded movement of the brake shoes 21 but at no times do the eccentric ends of the shoes engage the portions 38. The vane members are equi-distantly spaced about the flange or drum 12 and in the drawings I have shown seven in number. The fixed ends of the vane members may be welded or otherwise secured to the flange 12.

The interior of the housing 11 is adapted to be filled or partially filled with a fluid such as oil, and for facilitating the filling thereof, I provide a removable screw plug 40 in the plate 29.

In operation, assume that the interior of the housing 11 is filled or partially filled with oil and that the device is in an installed position upon the wheel of an automobile. The normal position of the parts are as shown in full lines in Figure 2 of the drawings and it is desired to stop the rotation of the housing 11. The operator depresses the foot brake pedal causing the rod or cable 36 to exert a pull upon the arm 35 which turns the movable spider 25. Movement of the spider 25 tends to expand the brake shoes 21, and when moved the same engage the vane members 37, and trap the fluid or oil between the same and force it through the restricted space between the brake shoes and the inner drum or flange 13. This constitutes the initial hydraulic braking action, and when the brake shoes are fully expanded, they depress the resilient vane members and frictionally engage the inner wall of the inner flange or drum 13, at which time the hydraulic effect is greatest as the oil is trapped and has no escape between the vanes other than by leakage. This action produces a smooth and positive braking action, which is noiseless.

The exterior of the flange or drum 12 being smooth serves as a drum for the auxiliary or emergency brake which is of the ordinary well-known construction and serves no part of this invention.

Although I have specifically stated one use for my present construction, here illustrated as a hydraulic brake, I do not wish to limit myself to the same as the invention may be used in connection with other rotatable parts such, for instance as a clutch or the like. Also the resilient vanes may be varied within the scope of the invention.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. A hydraulic device including a rotatable drum housing adapted to be filled with a fluid, expandible brake shoes for engagement with the inner peripheral wall of said drum housing, and resilient vane members extending inwardly from the peripheral wall for engagement by said brake shoes during their expanding movement prior to contact of said brake shoes with the peripheral wall.

2. A hydraulic brake including a rotatable drum housing provided with an annular flange in spaced relation to the annular peripheral wall thereof, resilient valve members mounted in the space between said annular flange and the peripheral wall of said drum housing, segmental brake shoes pivotally mounted in said drum housing, and actuating means for expanding said brake shoes to cause them to initially engage said resilient vane members and finally frictionally engage the said annular flange, substantially as and for the purpose specified.

3. A hydraulic brake including a rotatable drum housing provided with an annular flange in spaced relation to the annular peripheral wall thereof, resilient vane members mounted in the space between said annular flange and the peripheral wall of said drum housing, segmental brake shoes pivotally mounted in said drum housing, and actuating means for expanding said brake shoes to cause them to initially engage said resilient vane members and finally frictionally engage the said annular flange, said actuating means including a turnable member connected to the respective brake shoes by a pin and slot connection, substantially as and for the purpose specified.

4. In combination with a rotatable axle and the stationary axle housing therefor, an annular drum housing rotatable with said axle, a stationary spider fixed to said axle housing, segmental brake shoes pivoted to said spider for expanding engagement with the annular peripheral wall of said drum housing, an actuating member turnably mounted on said axle housing, pin and slot connections between said actuating member and the respective brake shoes, and manually actuated means for imparting turning movement to said actuating member, substantially as and for the purpose specified.

5. In combination with a rotatable axle and the stationary axle housing therefor, an annular drum housing rotatable with said axle, a stationary spider fixed to said axle housing, segmental brake shoes pivoted to said spider for expanding engagement with the annular peripheral wall of said drum housing, an actuating member turnably mounted on said axle housing, pin and slot connections between said actuating member and the respective brake shoes, resilient vanes extending inwardly from the annular wall of said drum housing, and manually actuated means for imparting turning movement to said actuating member substantially as and for the purposes specified.

6. In combination with a rotatable axle and the stationary axle housing therefor, an annular drum housing rotatable with said axle, a stationary spider fixed to said axle housing, segmental brake shoes pivoted to said spider for expanding engagement with the annular peripheral wall of said drum housing, a movable spider turnably mounted on said axle housing, pins carried by said movable spider for reception in slots provided in said brake shoes, an arm fixed to said movable spider exteriorly of said drum housing, and foot actuated means, including a rod, operatively connected to said arm, substantially as and for the purpose specified.

In testimony whereof I have affixed my signature.

CLARENCE E. JACK.